United States Patent
Ohlendorf et al.

(10) Patent No.: US 8,051,922 B2
(45) Date of Patent: Nov. 8, 2011

(54) HAND-HELD POWER TOOL WITH VIBRATION COMPENSATOR

(75) Inventors: Oliver Ohlendorf, Landsberg (DE); Christoph Dieing, Isny (DE); Frank Kohlschmied, Munich (DE); Axel Fischer, Wiedergeltingen (DE); Damir Cehajic, Durach (DE); Rainer Ontl, Landsberg am Lech (DE)

(73) Assignee: Hilti Aktiengesellschaft, Schaan (LI)

( * ) Notice: Subject to any disclaimer, the term of this patent is extended or adjusted under 35 U.S.C. 154(b) by 76 days.

(21) Appl. No.: 12/316,923

(22) Filed: Dec. 16, 2008

(65) Prior Publication Data

US 2009/0218114 A1  Sep. 3, 2009

(30) Foreign Application Priority Data

Dec. 17, 2007 (DE) .................. 10 2007 055 843

(51) Int. Cl.
*B25D 17/24* (2006.01)

(52) U.S. Cl. .................. 173/211; 173/162.2; 173/210

(58) Field of Classification Search .................. 173/211, 173/162.2, 210
See application file for complete search history.

(56) References Cited

U.S. PATENT DOCUMENTS

| | | | |
|---|---|---|---|
| 3,824,417 A * | 7/1974 | Moores, Jr. ................. | 310/51 |
| 4,014,392 A * | 3/1977 | Ross .......................... | 173/118 |
| 4,282,938 A | 8/1981 | Minamidate | |
| 4,401,167 A * | 8/1983 | Sekizawa et al. .......... | 173/162.1 |
| 4,478,293 A * | 10/1984 | Weilenmann et al. ..... | 173/162.2 |
| 5,012,147 A * | 4/1991 | Bertram et al. ............ | 310/80 |
| 5,025,870 A * | 6/1991 | Gantner ...................... | 173/162.2 |
| 5,697,456 A * | 12/1997 | Radle et al. ................ | 173/162.2 |
| 6,076,616 A * | 6/2000 | Kramp et al. .............. | 173/162.2 |
| 6,766,868 B2 * | 7/2004 | Frauhammer et al. ..... | 173/48 |
| 7,076,838 B2 * | 7/2006 | Meixner ..................... | 16/431 |
| 7,100,706 B2 * | 9/2006 | Meixner et al. ............ | 173/162.2 |
| 2002/0056558 A1 * | 5/2002 | Bongers-Ambrosius et al. .... | 173/201 |
| 2002/0185347 A1 * | 12/2002 | Pohl et al. .................. | 188/267.1 |
| 2003/0037937 A1 * | 2/2003 | Frauhammer et al. ..... | 173/48 |
| 2003/0132016 A1 * | 7/2003 | Meixner et al. ............ | 173/162.2 |
| 2004/0040729 A1 * | 3/2004 | Meixner ..................... | 173/162.2 |
| 2004/0231867 A1 * | 11/2004 | Becht et al. ................ | 173/162.2 |
| 2006/0169557 A1 | 8/2006 | Goetchius | |
| 2008/0022817 A1 * | 1/2008 | Fischer et al. ............. | 81/489 |
| 2008/0047724 A1 * | 2/2008 | Fischer et al. ............. | 173/162.2 |
| 2008/0202785 A1 * | 8/2008 | Fischer et al. ............. | 173/162.2 |

FOREIGN PATENT DOCUMENTS

| | | |
|---|---|---|
| DE | 815179 | 10/1951 |
| DE | 1281970 | 10/1968 |
| EP | 171 0052 | 10/2006 |
| FR | 2237734 | 2/1975 |
| GB | 2080919 A | 2/1982 |
| JP | 62 046042 | 2/1987 |
| JP | 03 140649 | 6/1991 |
| WO | WO 2007/102449 | 9/2007 |
| WO | WO 2008/140030 | 11/2008 |

* cited by examiner

*Primary Examiner* — Brian D Nash

(74) *Attorney, Agent, or Firm* — Davidson, Davidson & Kappel, LLC

(57) ABSTRACT

A hand-held power tool (1;101) includes a drive (6;110) located in the power tool housing (2;102) for driving a working tool (111), and a torsional pendulum (4; 120; 220; 320; 420; 520) at least partially mounted on the housing (2; 102) for compensating vibrations generated by the drive (6; 110).

20 Claims, 9 Drawing Sheets

HAND-HELD POWER TOOL WITH VIBRATION COMPENSATOR

BACKGROUND OF THE INVENTION

1. Field of the Invention

The present invention relates to a hand-held power tool and in particular to a hand-held power tool with a working tool periodically displaceable along an axis, such as hammer drill, combination hammer, chisel hammer, impact wrench, keyhole saw, and saber saw.

2. Description of the Prior Art

In a hammer drill, e.g., a drive accelerates a drill along a displacement axis. A pulse and/or a torque is applied to the drill, driving the drill in a workpiece. A complementary pulse that acts in an opposite direction, is applied to the user holding the power tool by the handle.

With periodically or cyclically operated hammer drills, the user must apply correspondingly a counter-force that periodically varies with time. This counter-force is perceived by the user as troublesome vibrations.

To improve the handling of the hammer drill, means is employed that uniformly distribute the generated forces over a period of time. Corresponding damping systems are excited by the cyclically generated forces and dissipate the excitation over a period of time. Alternatively or in addition, the damping systems dissipate the excitation, converting it to heat.

According to French publication FR 22 37 734, a passive vibration compensator is used for preventing vibrations in hand-held power tools.

German Publication DE 815 179 discloses an arrangement of two, axially oscillating, passive vibration compensators along a percussion mechanism for preventing vibrations.

German Publication DE 12 181 970 discloses a passive vibration compensator in form of a hollow cylinder.

European Publication EP 1 710 052 discloses a passive vibration compensator that surrounds a guide tube of the percussion mechanism and is displaced therealong.

Despite the use of numerous and different damping systems, vibrations, e.g., periodic torques, are still applied to a user of a hand-held power tool.

Accordingly, an object of the present invention is a hand-held power tool in which application of torques and vibrations to the power tool user is reduced to a most possible extent.

SUMMARY OF THE INVENTION

This and other objects of the present invention, which will become apparent hereinafter, are achieved by providing, in a hand-held power tool, a torsional pendulum for compensating the vibrations.

It has been recognized that in addition to the first forces generated along a displacement axis of a working tool or drive and acting on the user, also act on the user periodically second forces periodically generated in the direction transverse to the direction of action of the first forces. The user should press the power tool not only against a workpiece but also should overcome periodic pivotal or tilting displacement of the power tool relative to the workpiece.

One possible explanation of this can be seen in the offset position of the gravity center of the power tool relative to the displacement axis of the power tool. The axial acceleration of the tool produces a torque that acts on the power tool. Finally, the user should apply a counter-torque to the handle or handles.

The torsional pendulum can be excited by the generated torque and absorb the excitation with a time delay. This is true in particular for periodically generated torques which occur in hand-held power tools with cyclical displacement. The user or a support of the power tool is thus, subjected over time to a uniform load. In addition, dissipating elements, which are provided in the torsional pendulum, can damp its oscillating movement.

The concept of a torsional pendulum does not differ from a conventionally use definition within context of the present description. The torsional pendulum is suspended on a torsional axis or in a point about which the torsional pendulum can rotate. A return member becomes loaded during rotation so that the torsional pendulum rotates back in the direction of its rest position. The torsional pendulum is excited by an inertia moment acting on the mass of the torsional pendulum.

According to one embodiment of an inventive hand-held power tool, the drive is formed as a linear drive for displacing the working tool along a displacement axis, and the power tool has at least one torsional axis extending transverse to the displacement axis, and the torsional pendulum is suspended for a rotational oscillation about the torsional axis. The torsional pendulum can oscillate along a path in a plane. According to a preferred embodiment, the torsional pendulum oscillates along a curved path. This is particular the case when the torsional pendulum rotates about two torsional axis. The oscillation about one axis takes place essentially in one plane. Because of oscillation about the second axis, the torsional pendulum, with an increased rotation about the second axis, deviates transverse to the plane of rotation about the first axis.

According to a further embodiment of the present invention, the torsional pendulum is so arranged that the oscillation plane of the torsional pendulum extends parallel to or is inclined to the axis of the drive that is formed as a linear drive. The oscillation plane can extend parallel to the plane of symmetry of the power tool. The torsional pendulum can also be so arranged that its oscillation plane extends parallel to a plane defined by the gravity center of the power tool and the axis of the linear drive. Different arrangements of the torsional pendulum enable an efficient absorption of torques, which are generated in the hand-held power tool, by the torsional pendulum.

According to a particular embodiment of the present invention, the torsional axis of the torsional pendulum passes through the gravity center of the power tool. In this case, the torques, which are generated, by, the acceleration of the working tool, and the torques of the torsional pendulum are applied to a common axis of symmetry. A degree of a absorption of troublesome torques by the torsional pendulum, in this case, is advantageously very high.

According to the invention, the torsional pendulum has a torsional axis, a mass body, and at least one spring that mechanically connects the mass body with the torsional axis. The spring can have different forms. The spring is characterized by its function that consist in returning the mass body in its rest position after deviation of the mass body from the rest position. The mass body can constitute more than 28%, e.g., more than 50% of the total mass of the torsional pendulum. The mass body bears at least 50% of the inertia moment of the torsional pendulum. The mechanical connection of the mass body with the torsional axis can include a lever formed of a stiff material.

According to an embodiment of present invention, the at least one spring is formed as a leaf spring connecting the mass body with the torsional axis. The leaf spring, in addition to acting as a return member, also serves as a lever that retains the mass body at a distance from the torsional axis. This form of the torsional pendulum is characterized by its simplicity.

The spring and the mass body can also be formed together as one-piece part.

According to further development of the present invention, the spring has at least two sections having, respectively, different spring constants. In this case, the pivotal movement of separate sections of the torsional pendulum can be adapted to space requirements in the housing of the power tool. With a torque acting on the torsional pendulum, the section of the spring with a high spring constant has a smaller angular deviation relative to its connection point than the section with a low spring constant. In addition, trajectory of the mass body can be non-circular. Further, the two sections of the spring having different spring constants can be inclined toward each other. This permits to obtain numerous trajectory curves along which the mass body can move and which can be adapted to space requirement in the power tool.

According to the present invention, the inertia moment and/or the spring constant of the torsional pendulum are adjustable. The adjustment of the inertia moment is effected by shortening or lengthening the lever arm. To this end, a corresponding displacement mechanism is provided. The spring constant can be adjusted by varying the load acting on the spring or changing its effective length.

The linear drive displaces the working tool along the displacement axis cyclically with a predetermined cycle duration, and an oscillation period of the torsional pendulum is adapted to the cycle duration. With a resonance frequency of the torsional pendulum corresponding to the excitation frequency of the linear drive, an optimal absorption of the troublesome torques by the torsional pendulum is achieved.

According to one embodiment of the inventive power tool, it has a tool housing and a handle, with the torsional pendulum being hung up on the tool housing. The handle can be mechanically separated from the tool housing by vibration-damping elements.

According to a further development of the present invention, an oscillation path of the torsional pendulum extends at least partially over the handle. In particular, the trajectory curve of the mass body partially extends over the handle.

According to one of the embodiments of the inventive power tool, the linear drive can be formed as a percussion mechanism and include a percussion piston. The hand-held power tool can be formed as a column-displaceable power tool.

The torsional pendulum can be provided, according to the invention, on any percussion power tool such as, e.g., as hammer drill, combination hammer, chisel hammer impact wrench, or core drilling tool. Other hand-held power tool such as, e.g., keyhole saw and saber saw can also be provided with the torsional pendulum.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENTS

Figure 1:
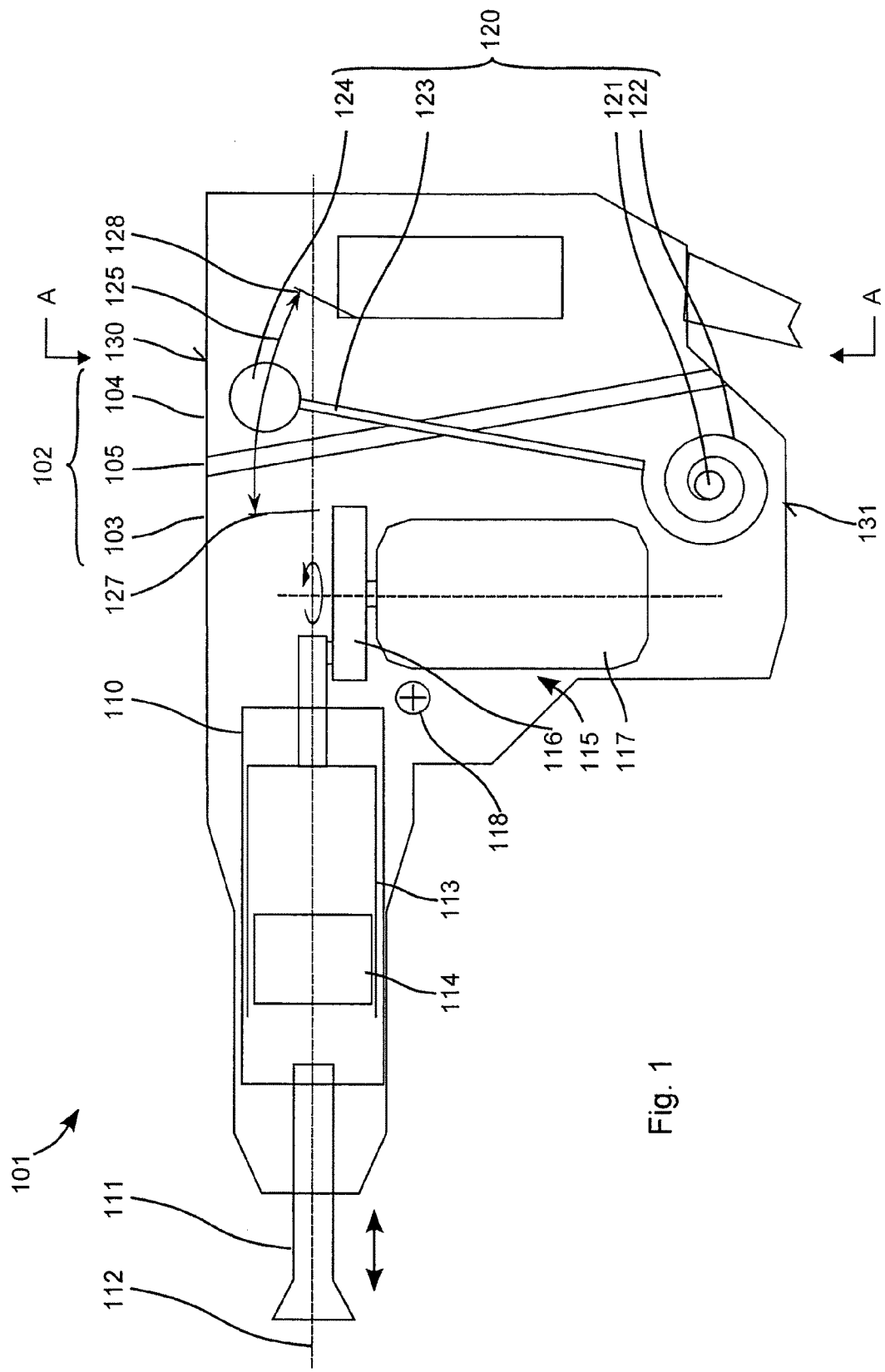
FIG. 1 a schematic longitudinal view of a first embodiment of a hand-held power tool according to the present invention.
Figure 2:
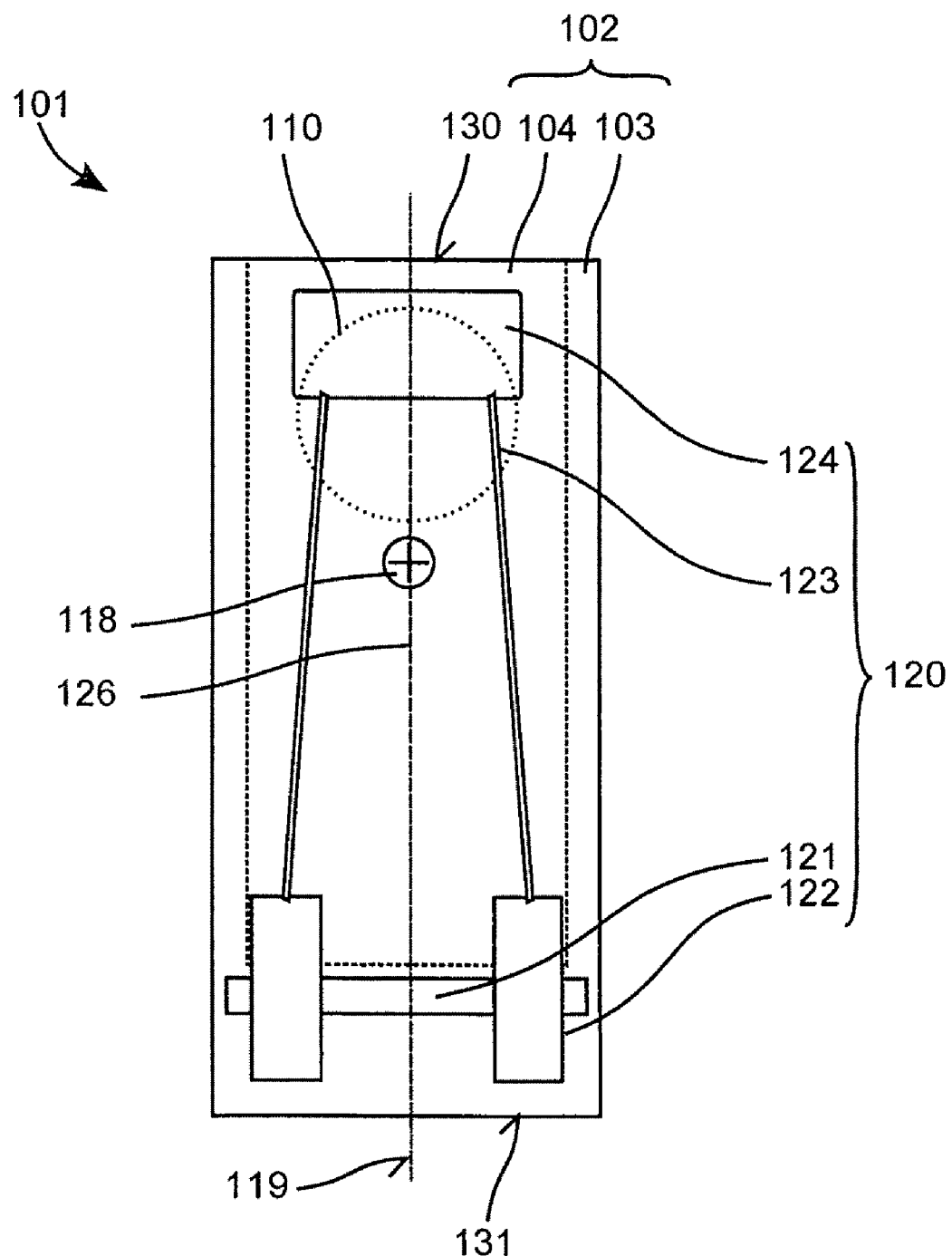
FIG. 2 a transverse view along line A-A of the power tool shown in FIG. 1.

A hand-held power tool 101 according to the present invention, which is shown in FIG. 1, can be formed, e.g., as a drilling tool, a hammer drill, or as any other hand-held power tool. The housing 102 of the hand-held power tool 101 can be formed as a one-piece part, or, alternatively, be formed of a tool housing 103 and a handle 104. The handle 104 is preferably separated from the tool housing by a vibration damping element 105. In another embodiment, instead of or in addition to the handle 104, a leg support can be provided. The leg support can be separated from the housing 102 or the tool housing 103 by vibration damping elements.

In the tool housing 103, there is arranged a linear drive 110 for driving a working tool 111 along a displacement axis 112. The linear drive 110 linearly accelerates the working tool 111. Thus, the linear drive 110 converts the translational movement into axial extorsional toward the working tool 111. The linear drive 110 can be formed, e.g., as a percussion mechanism 113 with a percussion piston 114. In an impact wrench or a hammer drill, the working tool 111, in addition to the translational movement, also rotates about the displacement axis 112.

The linear drive 110 can itself be driven by a primary drive 115 via an eccentric 116. The primary drive 115 can include an electric motor 117, magnetodynamic, electrodynamic, pneumatic, or hydraulic drive means.

The linear drive 110 is excited cyclically with a certain cycle duration. The cycle duration can be precisely predetermined for the power tool 110. Alternatively, a selector switch (not shown) can be provided with which the power tool user can select a desired cycle duration. An impact frequency of the power tool in inversely proportional to the cycle duration.

The gravity center 118 of the power tool 110 is spaced from the displacement axis 112. The position of the gravity center 118 is determined by arrangement of the heavy components of the power tool such as the linear drive 110 and the primary drive 115 in the housing 102. The gravity center 118 can lie in the plane of symmetry 119 of the power tool 101.

The linear drive 110 transmits a pulse to the working tool 111 in the direction of the displacement axis 112. A pulse of the same strength is applied in an opposite direction to the handle 104 or to the leg support. Though the displacement axis 112 does not pass through the gravity center 118, a pulse leads to a torque about the gravity center 118. The torque acts in a rotational plane that passes through the displacement axis 112 and the gravity center 118. The rotational plane coincides, in the embodiment of the power tool shown in FIG. 1, with the plane of symmetry 119 of the power tool 101 because both the displacement axis 112 and the gravity center 118 lie in the plane of symmetry 119.

The torque value can be determined based on the lever principle, taking into consideration the smallest distance between the displacement axis 112 and the gravity center 118. The torque value varies with the changes of the cycle duration that is predetermined by the linear drive 110. The impact frequency, which is noticeably greater than 1 Hz, results in that the power tool user perceives a torque not as a single event but as a continued vibration.

A torsional pendulum 120 is arranged in the tool housing 103. The torsional pendulum 120 has, e.g., a torsional axis 121, a return member 122, a lever 123, and a mass body 124. The torsional axis 121 can be secured in the tool housing 103 at the application point of the torsional pendulum 120. The return member 122 can be formed, e.g., as a leaf spring. The lever 123 can be formed as a rigid element. The mass body 124 preferably forms the main part of the mass of the torsional pendulum 120, at least 25%, e.g., 50%. The mass body 124 determines at least 50%, e.g., 75% of inertia moment of the torsional pendulum 120.

The mass body 124 can be displaced in the oscillation plane 126 of the torsional pendulum 120 along a trajectory curve 125. The trajectory curve 125 is substantially determined by the rigid lever 123. The trajectory curve 125 extends substantially along a circular path. For purposes of description of the trajectory curve 125, the gravity center of the mass body 124 can be considered as mass body 124.

In case the return member 122 becomes deformed upon displacement of the mass body 124 from its rest position, the return member 122 would likewise influence the shape of the trajectory curve 125. Correspondingly, a deviation from a circular path takes place. A deviation from a circular path also takes place when the lever 123 is formed at least partially elastic.

The oscillation plane 126 of the torsional pendulum 120 extends parallel to the rotational plane determined, as discussed above, by the displacement axis 112 and the power tool gravity center 118. Advantageously, the oscillation plane 126 coincides with the rotational plane, in particular when the rotational plane corresponds to the plane of symmetry 119 of the power tool 101.

After a single deviation, the torsional pendulum 120 oscillates with its natural frequency. The natural frequency describes a free oscillation of the torsional pendulum 120. The natural frequency of the torsional pendulum is determined by its design. In particular, the inertia moment of the torsional pendulum 120 and the spring constant of the return member 122 determine the natural frequency of the torsional pendulum 120. The inertia moment is determined by the distance of the mass body 124 from the torsional axis 121. This distance refers to the gravity center of the mass body 124. The position of the gravity center of the mass body 124 is determined by its shape.

The above-described arrangement of the torsional pendulum 120 in the power tool 101 leads to a rotational oscillation of the torsional pendulum in response to periodically generated torques. The torsional pendulum 120 absorbs a torque up to a reverse point 127, 128. The torque leads to a partial deformation of the return member 122. A further smaller portion of the torque can provide for a plastic deformation and other dissipative action. The torsional pendulum 120 relaxes after reaching the reversing points 127, 128 of the trajectory curve 125, dissipating the torque.

A phase of the exciting torque precedes a phase of the torque dissipated by the torsional pendulum 120. Thereby, a partially destructive and a partially constructive overlapping of both torques occurs. Though a temporary standardized torque, except the dissipative components, remains, the maximum amplitude of the entire torque is smaller than the amplitude of a periodic torque generated by the linear drive 110. The torsional pendulum 120 acts as a buffer that absorbs peak values of a torque and releases it with a time delay.

According to an advantageous embodiment, the natural frequency of the torsional pendulum 120 or its harmonic frequency corresponds to the impact frequency of the linear drive 110. At a resonant excitation, the torsional pendulum 120 experiences its largest deviation from its rest position. As a result, the torsional pendulum 120 can absorb the largest torque and buffer it. The phase difference between the exciting torque and the torque, which is absorbed by the torsional pendulum 120, amounts to about 90°.

The transmission of the periodic torque to the torsional pendulum 120 is particular efficient in the case of resonance. Therefore, the torsional pendulum 120 can be designed with a natural frequency that deviates maximum by 10%, e.g., by 5% and, preferably, by 2% from the impact frequency of the linear drive 110.

The above explanations summarized the inventors' working hypothesis concerning the operational principles of the torsional pendulum 120. The working hypothesis enables to develop a torsional pendulum 120. However, no claim is made as to the complete scientific explanation. In particular, a hand-held power tool is not limited by the above explanations in case the operational principles of a torsional pendulum are not covered by the above-referenced-to working hypothesis.

Below several embodiments of different torsional pendulums and their arrangement in the housing of a hand-held power tool will be described. Though many details will be discussed in connection with a specific embodiment, it is explicitly stated that the discussed details can be combined in different ways to form embodiments which differ from the discussed specific embodiment.

FIG. 1 shows a torsional pendulum 120 the return member 122 of which is formed by a spiral spring. The center of the spiral spring is secured to the tool housing 103. The spiral spring can rotate about its center and, thus, can be mechanically tensioned. The lever 123 is secured to the circumference of the spiral spring. The lever 123 is preferably rigid. The mass body 124 is secured at the end of the lever 123 remote from the spiral spring. The mass body 124 is formed of the same material as the lever 123. In one of the embodiments, the mass body 124 and the lever 123 are formed as a one-piece part.

The spiral spring changes its shape only insignificantly when the torsional pendulum 120 is deflected. In particular, the torsional pendulum 120 can be deflected from its rest position at most by 30°, e.g., by 10°, preferably, by 5°. In this case, the mass body 124 is displaced primarily over a trajectory curve 125 that corresponds to a circular path.

The circular path lies in a plane parallel to a plane that is defined by the gravity center 118 and the displacement axis 112. In the rest position, the lever 123 can be inclined, e.g., relative to the displacement axis 112 at angle in a range between 20° and 90°. The torsional axis 121 can, as shown in FIG. 1, be located in the vicinity of the bottom 131 of the housing 102. Alternatively, the torsional axis can be located in vicinity of the upper surface 130 of the housing 102. This provides for a suspended construction. According to a still further embodiment, the torsional pendulum 120 can be secured on the housing of the primary drive 115 or of the gear unit.

The length of the lever 123 is preferably greater than a half of the height of the housing 102, e.g., two/third of the height of the housing 102. A torsional pendulum 120 with a larger lever 123 can buffer a greater torque already at a small deviation from the rest position.

Advantageously, the torsional pendulum 120 is secured on the tool housing 103. The handle 104 can be mechanically separated from the torsional pendulum 120, e.g., by damping element 106. The trajectory curve 125 can partially extend in the handle 104. E.g., the mass body 124 can be located in the rest position, already in the handle 104, as shown in FIG. 1.

The torsional pendulum 120 can be also arranged in the tool housing 103 so that the lever 123 extends parallel to the displacement axis 112 of the power tool 111.

The gravity center of the mass body 124 can lie outside of the rotational plane defined by the gravity center of the power tool 101 and the displacement axis 112. In this case, the oscillation of the torsional pendulum 120 produces a torque that lies in plane extending transverse to the displacement axis 112. Corresponding torques, which are produced by the linear drive 110, can be compensated in this way.

For a hand-held power tool 101 having a mass of 6700 g and a dominant frequency of 53 Hz, e.g., a spring constant of about 1.1 Non/°, a length of the lever 124 of about 200 mm, and a mass of the mass body of about 100 g prove to be adequate. These figures serve only as an example. Different combinations of other spring constant, lengths, and masses likewise may be suitable for specific power tools.

Figure 3:
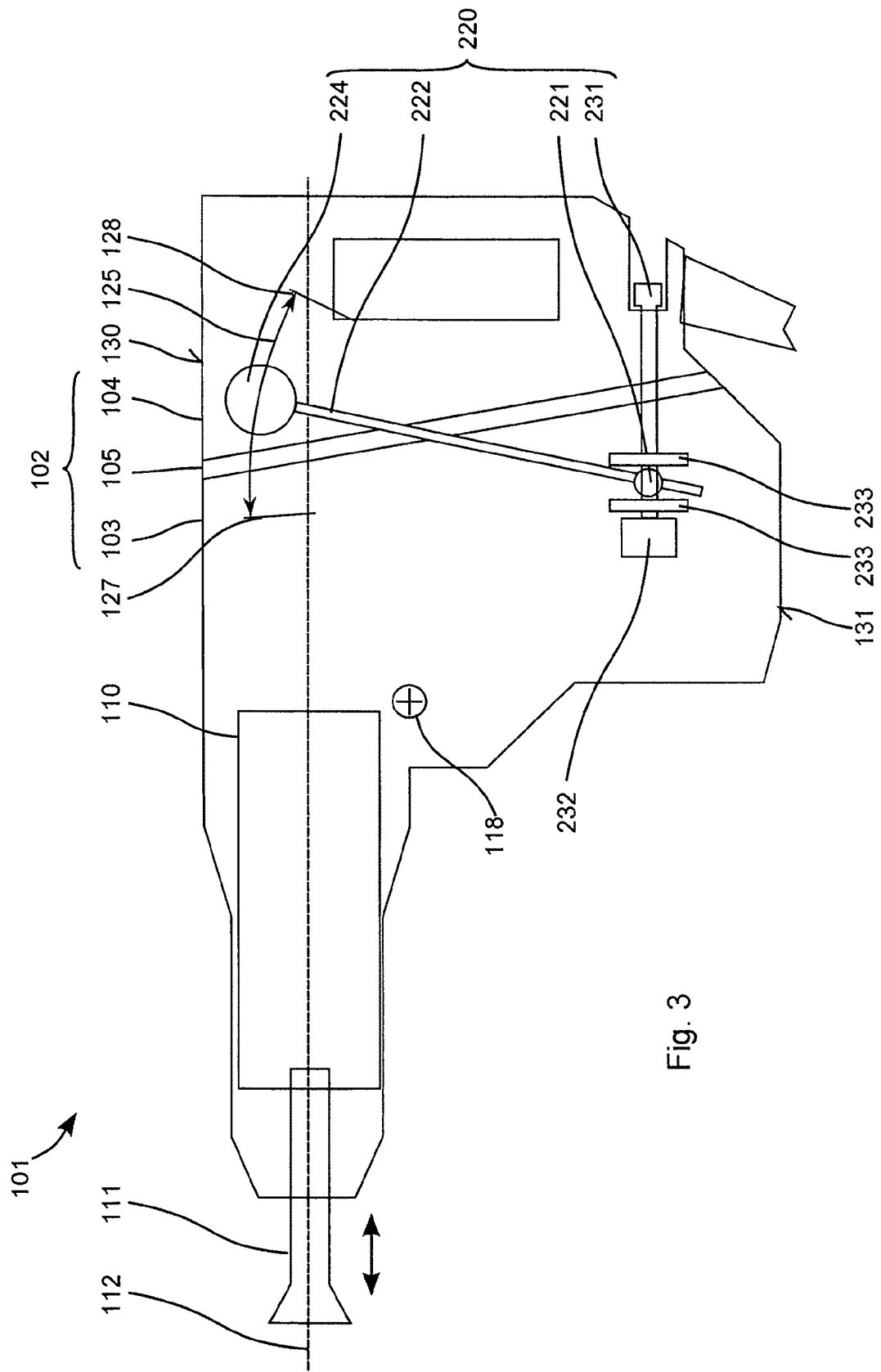
FIG. 3 a schematic longitudinal view of a second embodiment of a hand-held power tool according to the present invention.
Figure 4:
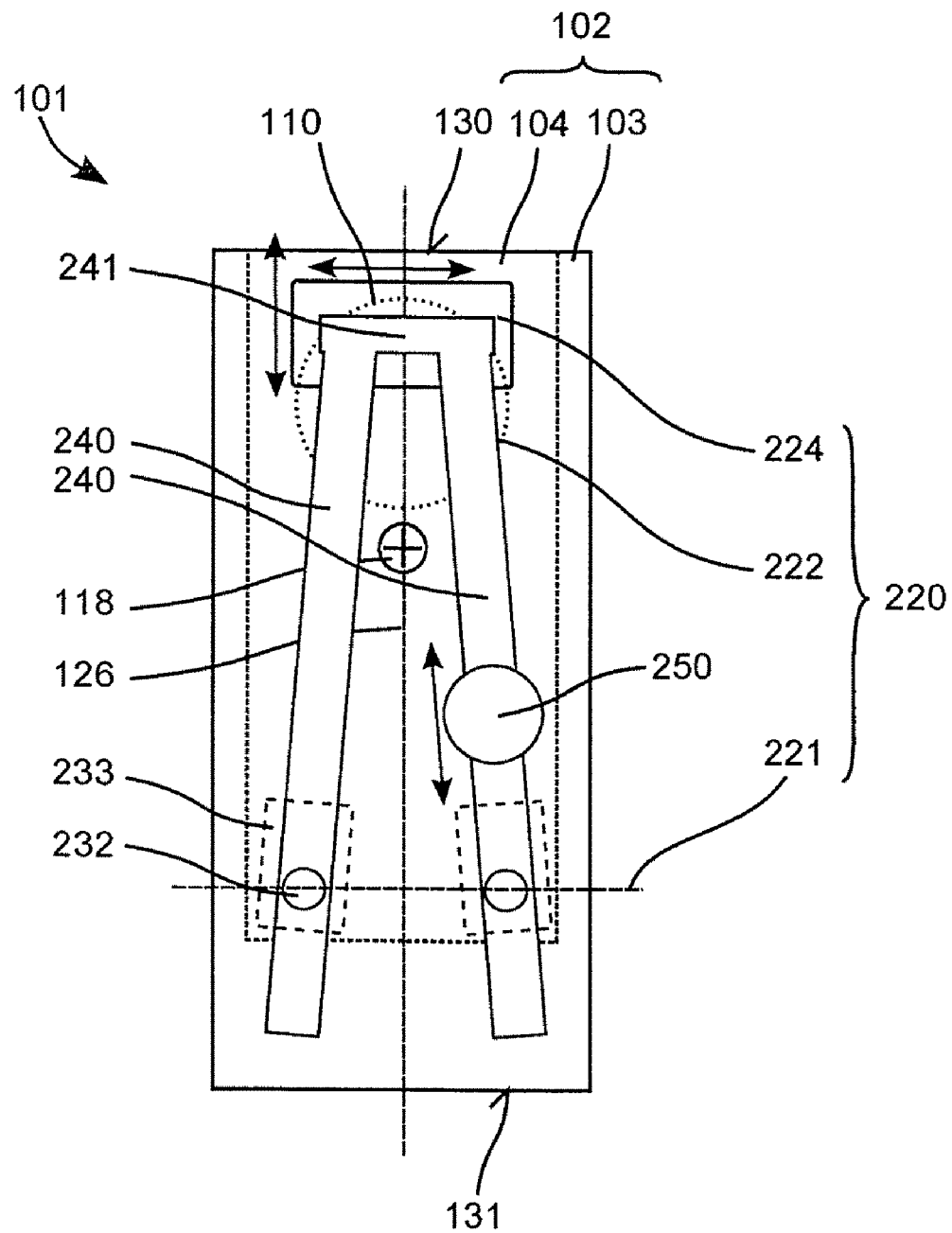
FIG. 4 a transverse view similar to that of FIG. 2 of the power tool shown in FIG. 3.

FIGS. 3 and 4 show another embodiment of a torsional pendulum according to the present invention. The torsional pendulum 220 has a torsional axis 221, a leaf spring 222, and a mass body 224. The leaf spring 222 forms both the return member and the lever. This insures a particularly simple construction of the torsional pendulum according to the present invention.

The leaf spring 222 is supported with one of its end on the tool housing 103. This end forms the torsional axis 221. The support can be formed, e.g., by a fastening screw 231 that serves for securing the handle 104 on the anchor 233 of the tool housing 103. For securing the end of the leaf spring 222 on the tool housing 103, the end is provided with a bore 232 through which the fastening screw 231 is extendable. The anchor 233 in form of locating legs can be arranged respectively, on both sides of the bore 232 to prevent displacement of the leaf spring 222 along the fastening screw 231. The locating legs can be formed of an elastic damping material to prevent transmission of the oscillations of the tool housing 103 to the handle 104.

The leaf spring 222 can be formed as a U-shaped element with two symmetrically arranged webs 240 and a cross-web 241 connecting the two webs 240. The mass body 224 is secured on the transverse web 241. The mass body 224 can be formed of two parts that are assembled together and enclose the cross-web 241.

For changing the material frequency of the torsional pendulum 220, an additional mass 250 can be provided. The additional mass 250 can be clamped on the leaf spring 22 as a rider. The additional mass 250 can be displaced along a web 240 of the leaf spring 222.

In a further embodiment, the mass body 224 can be made displaceable along the leaf spring 222. The mass body 224 can be held on the leaf spring 222 with a locking mechanism to insure a predetermined distance of the mass body 224 from the torsional axis 221.

The torsional pendulum 220 can rotate about the torsional axis 221 and additionally about a vertical torsional axis 251. This is particularly advantageous when the gravity center 118 of the power tool 101 and the displacement axis 112 do not lie in a plane extending parallel to the oscillation plane 126. The additional rotational direction of the torsional pendulum 220 absorbs the torque acting transverse to the displacement axis 112 and transverse to the torsional axis 221.

Figure 5:
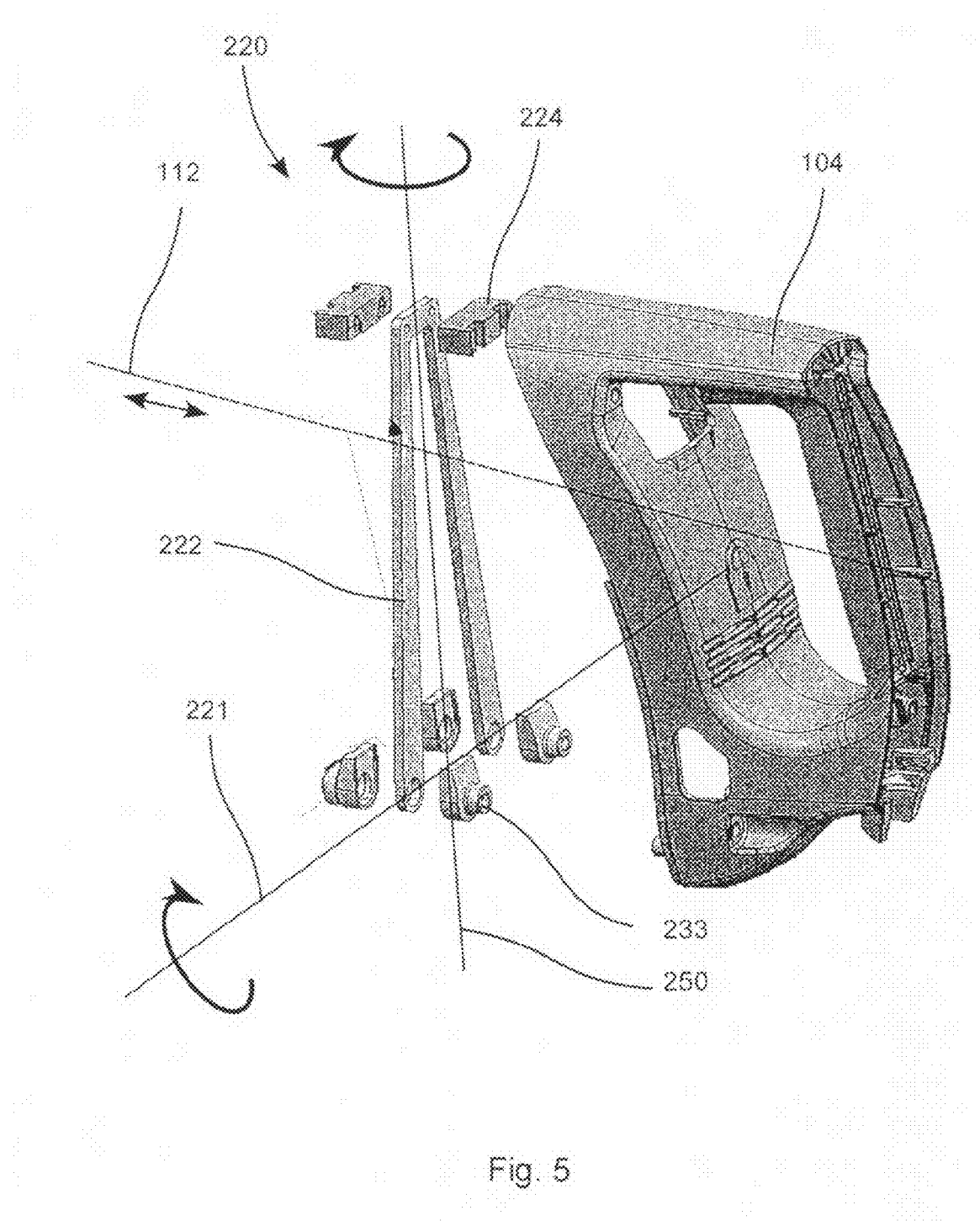
FIG. 5 an exploded view of a torsional pendulum for use in a hand-held power tool according to the present invention.

FIG. 5 shows the embodiment of the torsional pendulum 220 that rotates about the two torsional axes 221 and 251. The torsional axes 221 and 251 are tilted toward each other and relative to the displacement axis 112 of the linear drive 110 of the power tool 101. In the embodiment shown in FIG. 5, all of the three cases 112, 221 and 251 extend perpendicular to each other.

The torsional pendulum 220 can be excited by a rotary pulse acting parallel to the first torsional axis 221 or parallel to the second torsional axis 251 and by any arbitrary combination of the two pulses. This reduces the vibrations which could have been transmitted to the user as movement of the handle 104 toward and away from the user or to the left or right.

The mass body 224 is supported with a possibility of displacement parallel to the first torsional axis 221. Thereby, the inertia moment about the second torsional axis 251 can be adapted to the generated oscillations, in particular, frequencies.

Figure 6:
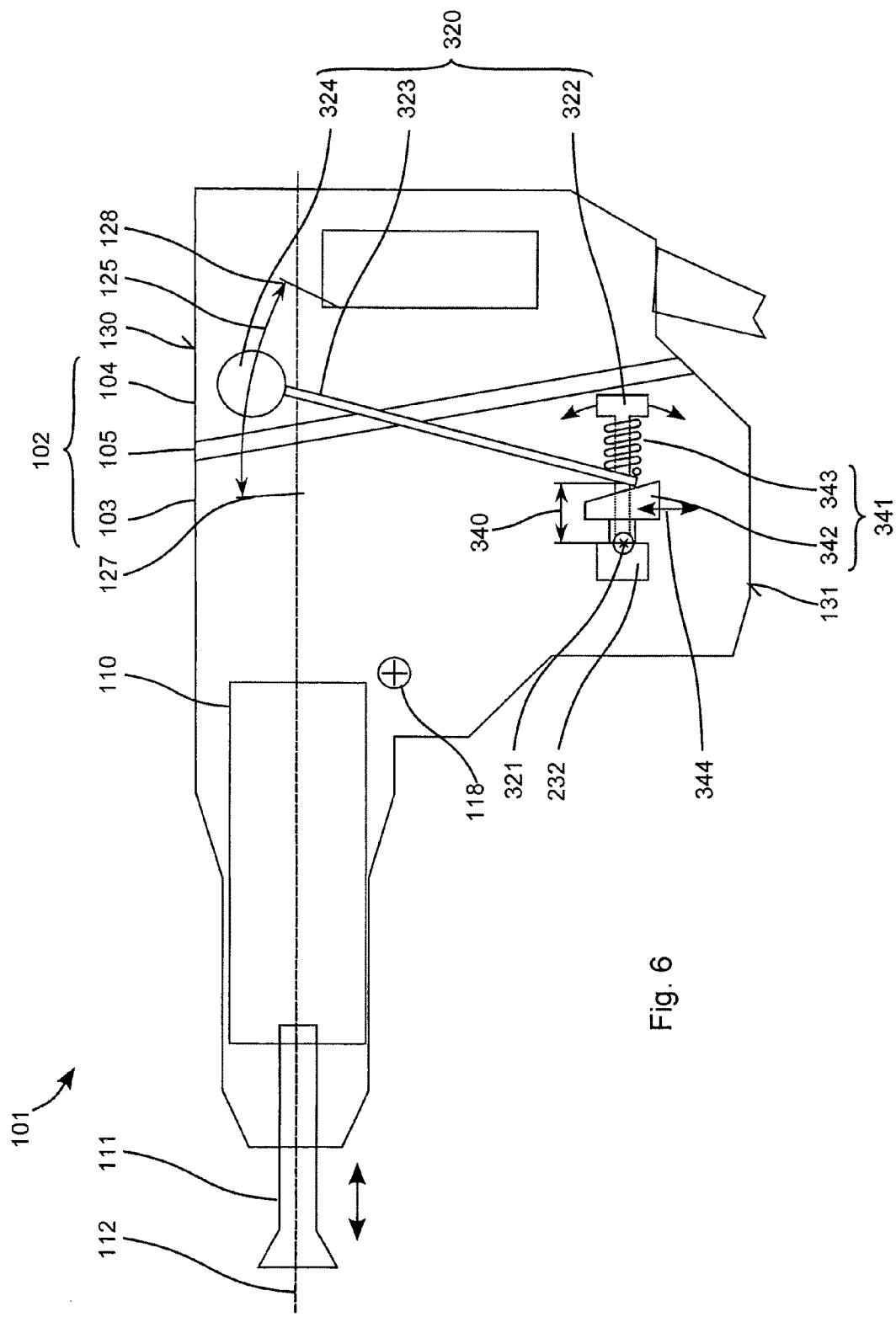
FIG. 6 a schematic longitudinal view of a third embodiment of a hand-held power tool according to the present invention.

A further embodiment of a torsional pendulum according to the present invention is shown in FIG. 6. The torsional pendulum 320 has a spring 322 that is connected with the tool housing 103. The connection point of the spring 322 with the tool housing 103 defines the torsional axis 321 of torsional pendulum 320. The curve path in FIG. 6 shows the movement of the spring 322 during oscillations of the torsional pendulum 320. The lever 323 is displaceably supported on the spring 122. The lever 323 connects the spring 322 with the mass body 324. The natural frequency of the torsional pendulum 320 can be set by varying the distance 340 by which the lever 323 is spaced from the torsional axis 321.

Mechanism 341 for setting the distance 340 can, e.g., include a wedge 342 and a return spring 343. The wedge 342 provides for retaining of the distance 340 in the rest position of the lever 323 on the spring 322. The wedge 342 is displaceable in direction 344 transverse to the longitudinal direction of the spring 322. This displacement of the wedge 342 permits to adjust the distance 340. The return spring 343, which is arranged on a side of the lever 323 opposite the wedge 342, fixedly secures the lever 323 on the wedge 342. Instead of the wedge 342, other displacement means can be provided, e.g., a spindle.

Change of the effective length of the spring 322 results in a change of the spring constant and in a change of the distance of the mass body 324 from the torsional axis 321. Thus, the mechanism 341 permits to adapt the natural frequency of the torsional pendulum 320 to the impact frequency of the linear drive 110 of the power tool 101. A corresponding selector switch for selecting the impact frequency can be connected with the mechanism 341 mechanically or electromechanically by a rod.

The lever 323 and the spring 322 are preferably inclined toward each other. The inclination angle can lie in a range from 30° to 120°, in particular in a range from 80° to 100°. According to one embodiment, the lever 323 can be telescopically arranged relative to the spring 322.

Figure 7:
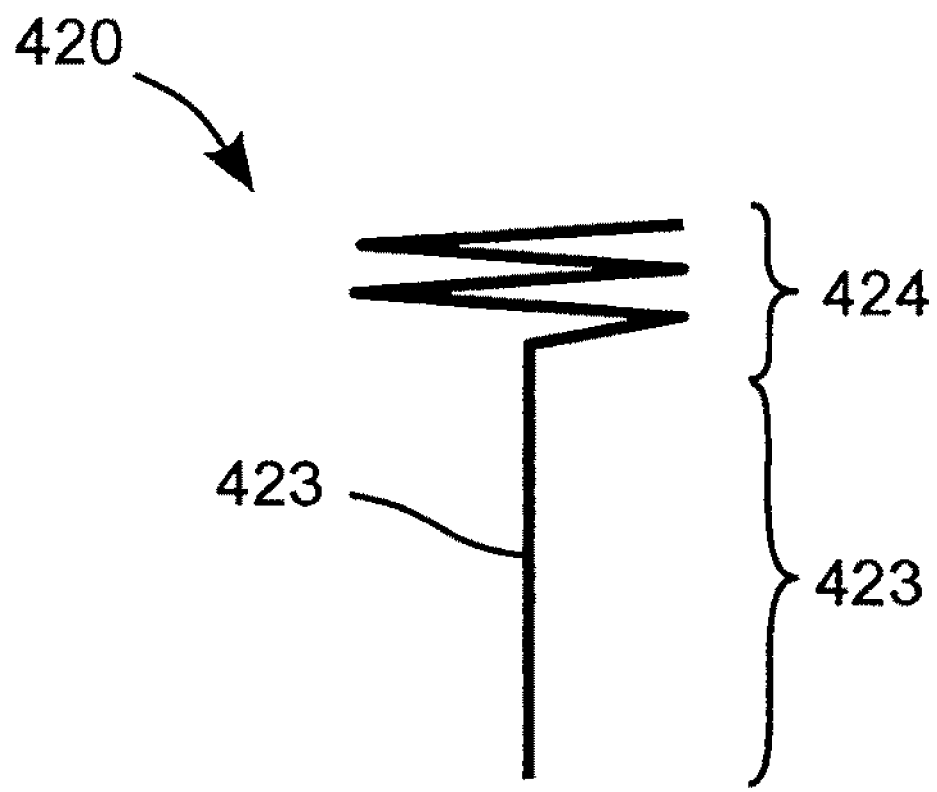
FIG. 7 a schematic side view of a torsional pendulum for use in a hand-held power tool according to the present invention.

FIG. 7 shows, as discussed above, a side view of the torsional pendulum. The torsional pendulum 420, which is shown in FIG. 7, can be formed of a leaf spring. The lever 423 simultaneously forms a return spring 422. The mass body 424 is formed by an end of leaf spring which is folded multiple times.

Figure 8:
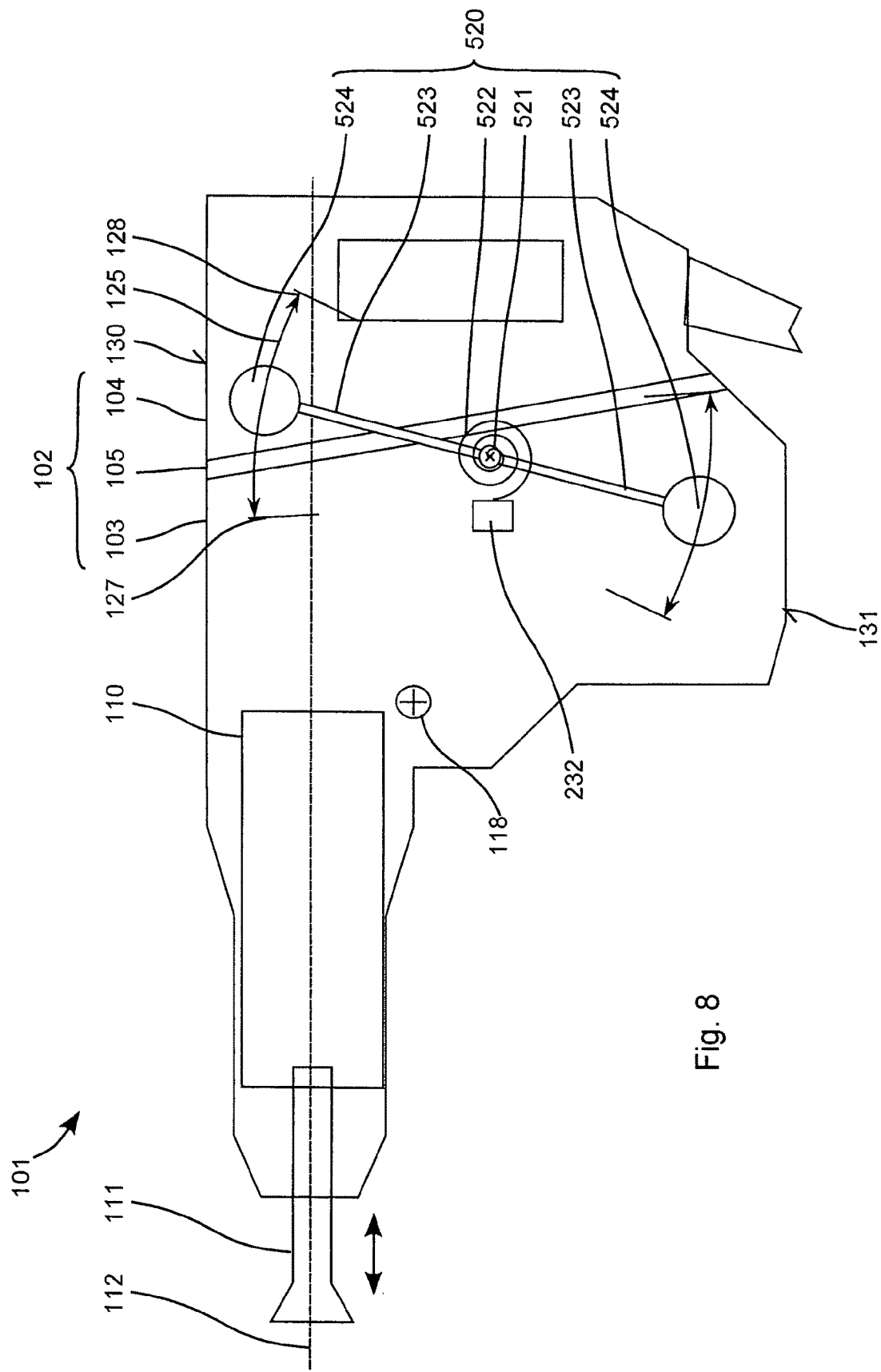
FIG. 8 a schematic longitudinal view of a fourth embodiment of a hand-held power tool according to the present invention.

FIG. 8 shows yet another embodiment of a power tool 101. The pendulum 520 of the power tool 101 has a torsional axis 521 associated with at least two mass bodies 524. The mass bodies 524 are mechanically connected with the torsional axis 521 by a lever 523 and a common return member 522. The gravity center of the torsional pendulum 520 preferably lies on the torsional axis 521.

The torsional pendulum 520 permits to arrange the torsional axis 521 in the vicinity of the gravity center 118 of the power tool 101 and simultaneously provides a high inertia moment. Torques, which are absorbed and released by the torsional pendulum 520 are applied to the same center of rotation as the torques generated by the linear drive 110, Thereby, a very good damping of torsional vibrations by the torsional pendulum 520 is achieved.

Figure 9:
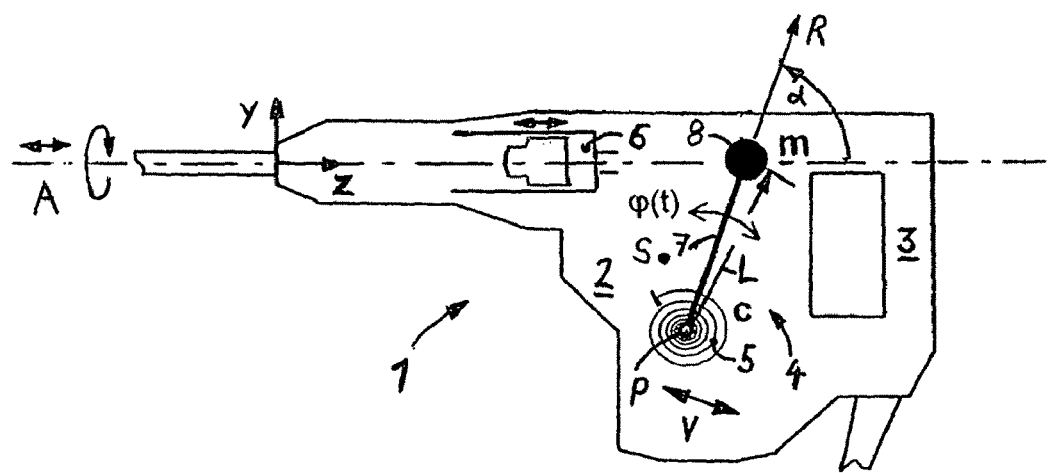
FIG. 9 a schematic view of a hand-held power tool according to the present invention formed as a hammer drill.

FIG. 9 shows a hand-held power tool 1 in form of a rotary-percussion drill having a tool housing 2 and a hand-held guide handle 3. The power tool 1 further has a drive 6 in form of a pneumatic percussion mechanism, and a vibration compensator 4 for damping vibrations generated by the drive 6 in the power tool plane in which the power tool gravity center S lies. The vibration compensator 4 is formed as torsional pendulum having a spring-biased lever 7 in form of a wire spring and a torsional spring 5 in form of a spiral spring associated with the lever 7.

A mass body 8 of the torsional pendulum which is held at a distance from the pivot point by the lever 7, oscillates with an angular deflection 4(t) from its rest position R, in an oscillation plane that coincides with the power tool plane. The rest position R of the mass 8 is oriented to a handle side of the excitation axis a at an angle S of 70°.

In case (not shown), the mass body 8 is formed of two equally large mass body portions fixedly connected with each other and arranged respectively, beneath and above the power tool plane. With the centers of the mass portions located in respective planes extending parallel to and equidistantly spaced from the power tool plane, the center of the entire compensation mass would lie in the power tool plane. As a result, the power tool plane would coincide with the oscillation plane of the of the mass body 8. However, different orientations of the oscillation plane to the power tool plane are also possible. These other orientations also lie within the scope of the present invention. The foregoing principle also applies to a saber or keyhole saw (not shown), wherein the excitation, which is produced as a result of operation of the drive 6, is generated by a reciprocating movement of the push rod and the cutting resistance instead of being generated by the pneumatic percussion mechanism.

E.g., for a rotary-percussion drill a tool mass of 6700 g and dominant vibration frequency of 53 Hz, for the vibration compensator 4, torsional pendulum 4, which oscillates about the pivot point p at Z=340 mm and Y=−180 mm about its rest positions R that is oriented at an angle 2 of 70° to the handle side of the excitation axis A with angular deviation $\phi$ of +/−4°, the value triad {C=1.1 Nm/°; L=200 mm; m=100 g}, where C is a spring constant of the spring 5, L is the length of the lever 7, and m is the mass of the mass body 8, is adequate.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A hand-held power tool, comprising: a housing including a handle; a drive located in the housing for driving a working tool; and a torsional pendulum at least partially mounted on the housing for compensating vibrations generated by the drive, the torsional pendulum being defined by a body of mass and a spring attached to a point, the body of mass swinging back and forth in an arcuate path with respect to the point via the spring, the body of mass being movable with respect to the housing.

2. The hand-held power tool as recited in claim 1 wherein the drive is a linear drive for displacing the working tool along a displacement axis, the power tool having at least one torsional axis extending transverse to the displacement axis through the point.

3. The hand-held power tool as recited in claim 2 wherein a plane defined by the displacement axis and a gravity center of the power tool extends parallel to or coincides with an oscillation plane of the torsional pendulum.

4. The hand-held power tool as recited in claim 2 wherein the at least one torsional axis passes through a gravity center of the power tool.

5. The hand-held power tool as recited in claim 2 wherein the linear drive displaces the working tool along the displacement axis cyclically with a predetermined cycle duration, and wherein an oscillation period of the torsional pendulum is adapted to the cycle duration.

6. The hand-held power tool as recited in claim 2 wherein the housing is formed of a power tool housing part and the handle, the torsional pendulum being hung on the tool housing.

7. The hand-held power tool as recited in claim 6 wherein an oscillation path of the torsional pendulum extends at least partially along the handle.

8. The hand-held power tool as recited in claim 1 wherein the drive is a linear drive for displacing the working tool along a displacement axis, and an oscillation plane of the torsional pendulum extends parallel to or coincides with the displacement axis.

9. The hand-held power tool as recited in claim 8 wherein the oscillation plane of the torsional pendulum extends parallel to a plane of symmetry of the power tool passing through the displacement axis.

10. The hand-held power tool as recited in claim 1 wherein the spring has a first section having a different spring constant than a second section.

11. The hand-held power tool as recited in claim 10 wherein the at least two spring sections are inclined toward each other.

12. The hand-held power tool as recited in claim 1 wherein the torsional pendulum has an inertia moment adjustable in at least one oscillation direction.

13. The hand-held power tool as recited in claim 1 wherein the drive is formed as a percussion drive.

14. A hand-held power tool, comprising: a housing including a handle; a drive located in the housing for driving a working tool; and a torsional pendulum at least partially mounted on the housing for compensating vibrations generated by the drive, the torsional pendulum being defined by a body of mass and a spring attached to a point, the body of mass swinging back and forth in an arcuate path with respect to the point via the spring, the body of mass being movable with respect to the housing, the spring being a leaf spring.

15. The hand-held tool as recited in claim 14 wherein the leaf spring is U-shaped with two symmetrically arranged webs and a cross web connecting the two webs.

16. The hand-held tool as recited in claim 14 wherein the torsional pendulum includes an additional mass displaceable along the leaf spring.

17. The hand-held tool as recited in claim 14 wherein the mass body is displaceable along the leaf spring.

18. The hand-held tool as recited in claim 14 wherein the torsional pendulum swings back and forth about the point and about an additional torsional axis.

19. A hand-held power tool, comprising: a housing including a handle; a drive located in the housing for driving a working tool; and a torsional pendulum at least partially mounted on the housing for compensating vibrations generated by the drive, the torsional pendulum being defined by a body of mass and a spring attached to a point, the body of mass swinging back and forth in an arcuate path with respect to the point via the spring, the body of mass being movable with respect to the housing, the spring being a spiral spring.

20. The hand-held power tool as recited in claim 19 wherein the torsional pendulum further includes a lever secured to the circumference of the spiral spring at one end and to the body of mass at another end, a center of the spiral spring secured to the housing at the point.

\* \* \* \* \*